US010891702B2

(12) United States Patent
Kim et al.

(10) Patent No.: US 10,891,702 B2
(45) Date of Patent: Jan. 12, 2021

(54) DUPLICATE IMAGE EVIDENCE MANAGEMENT SYSTEM FOR VERIFYING AUTHENTICITY AND INTEGRITY

(71) Applicants: 4DREAM CO., LTD., Andong-si (KR); HANWHA TECHWIN CO., LTD., Seongnam-si (KR)

(72) Inventors: Won-Kug Kim, Andong-si (KR); Jin-Kyo Shin, Seongnam-si (KR)

(73) Assignees: 4DREAM CO., LTD., Andong-si (KR); HANWHA TECHWIN CO., LTD., Seongnam-si (KR)

( * ) Notice: Subject to any disclaimer, the term of this patent is extended or adjusted under 35 U.S.C. 154(b) by 259 days.

(21) Appl. No.: 15/762,411

(22) PCT Filed: Sep. 23, 2016

(86) PCT No.: PCT/KR2016/010603
§ 371 (c)(1),
(2) Date: Mar. 22, 2018

(87) PCT Pub. No.: WO2017/052240
PCT Pub. Date: Mar. 30, 2017

(65) Prior Publication Data
US 2018/0276778 A1  Sep. 27, 2018

(30) Foreign Application Priority Data
Sep. 22, 2015 (KR) .......................... 10-2015-0133594

(51) Int. Cl.
*G06F 16/13* (2019.01)
*G06F 16/00* (2019.01)
(Continued)

(52) U.S. Cl.
CPC ............ *G06Q 50/26* (2013.01); *G06F 16/00* (2019.01); *G06F 16/137* (2019.01); *G06F 16/51* (2019.01); *G06Q 30/018* (2013.01); *H04L 67/42* (2013.01)

(58) Field of Classification Search
CPC ...... G06Q 50/26; G06Q 30/018; G06F 16/00; G06F 16/51; G06F 16/137; H04L 67/42
See application file for complete search history.

(56) References Cited

U.S. PATENT DOCUMENTS

2005/0033728 A1* 2/2005 James .................. G06F 8/60
2009/0268259 A1* 10/2009 Kikuchi ............ H04N 1/32128
358/468

(Continued)

FOREIGN PATENT DOCUMENTS

JP    2010-98628 A     4/2010
KR    10-0822790 B1    4/2008

(Continued)

OTHER PUBLICATIONS

Search Report dated Dec. 19, 2016, issued by the International Searching Authority in counterpart International Patent Application No. PCT/KR2016/010603 (PCT/ISA/210).

(Continued)

*Primary Examiner* — Nelson S. Giddins
(74) *Attorney, Agent, or Firm* — Sughrue Mion, PLLC

(57) ABSTRACT

The present disclosure relates to a duplicate image evidence management system for verifying authentication and integrity, the duplicate image evidence management system being capable of verifying that a duplicate image has authentication and integrity when an original image generated by an image storage device is copied by an image collecting device. The duplicate image evidence management system according to the present disclosure includes: an image generating unit for generating an original image; a hash (Continued)

generating unit for generating an original hash value for the original image; a hash checking unit for checking whether the original hash value is changed; and a duplicate image generating unit for copying the original image so as to generate a first duplicate image and generating a first hash value for the first duplicate image, when it is checked by the hash checking unit that the original hash value is not changed.

20 Claims, 9 Drawing Sheets

(51) Int. Cl.
*G06F 16/51* (2019.01)
*G06Q 50/26* (2012.01)
*G06Q 30/00* (2012.01)
*H04L 29/06* (2006.01)

(56) References Cited

U.S. PATENT DOCUMENTS

2009/0319570 A1* 12/2009 Subramanian .......... G06F 16/50
2013/0279880 A1* 10/2013 Kim ..................... H04N 9/79
   386/239
2014/0181057 A1* 6/2014 Euresti ................. G06F 16/174
   707/698
2016/0350326 A1* 12/2016 Simonetti ............ G06F 16/137

FOREIGN PATENT DOCUMENTS

| KR | 10-1058592 B1 | 8/2011 |
| KR | 10-2014-0081916 A | 7/2014 |
| KR | 10-1468407 B1 | 12/2014 |
| KR | 10-1512021 B1 | 4/2015 |
| KR | 101512021 B1 * | 4/2015 |

OTHER PUBLICATIONS

Written Opinion dated Dec. 19, 2016, issued by the International Searching Authority in counterpart International Patent Application No. PCT/KR2016/010603 (PCT/ISA/237).

Communication dated Dec. 19, 2015, issued by the Korean Intellectual Property Office in counterpart Korean Patent Application No. 10-2015-0133594.

* cited by examiner (a)

| i) | CODE A | DUPLICATE IMAGE DATA | HASH 1 | | |
|---|---|---|---|---|---|
| ii) | CODE A' | DUPLICATE IMAGE DATA | HASH 1 | HASH 2 | |
| iii) | CODE A" | DUPLICATE IMAGE DATA | HASH 1 | HASH 2 | HASH 3 |

(b)

| CODE A | DUPLICATE IMAGE DATA | HASH 1 | | |
|---|---|---|---|---|
| CODE A' | DUPLICATE IMAGE DATA | HASH 1 | HASH 2 | |
| CODE A" | DUPLICATE IMAGE DATA | HASH 1 | HASH 2 | HASH 3 |

GROUPING (c)

COMPARISION OF STORED ORIGINAL HASH VALUE($H_0$)
AND ORIGINAL HASH VALUE($H_0'$) WHICH IS GENERATED
JUST BEFORE COLLECTING(@$t_2$)

DUPLICATE IMAGE EVIDENCE MANAGEMENT SYSTEM FOR VERIFYING AUTHENTICITY AND INTEGRITY

TECHNICAL FIELD

The present disclosure relates to a duplicate image evidence management system for verifying authentication and integrity, more particularly, to a duplicate image evidence management system for verifying authentication and integrity, the duplicate image evidence management system being configured to verify that a duplicate image has authentication and integrity when an original image generated by an image storage device is copied by an image collecting device.

BACKGROUND ART

During existing computer forensic investigations using image files captured by closed-circuit televisions (CCTVs), when image storage devices remain fixed to their original location instead of being impounded and sealed on the spot, original images in the image storage devices are completely deleted after a certain period of time passes, and evidence disappears unintentionally. Accordingly, there have been problems on authentication of original images.

Also, according to an existing CCTV image crime protection system, since it is difficult to detach an image storage device on the spot for a criminal investigation, all images, which are captured at an estimated time of a crime, are copied first, examined during the investigation, and used as evidence. In addition, it is difficult to restore image files, which have been overwritten several times because a storage period has expired, and use the image files as evidence.

Moreover, with regard to original image files, a Korean court said in a case: "admissibility of evidence of a duplicate video is accepted once identity between an original video and a duplicate video, authenticity of the duplicate video, and integrity of the duplicate video are verified. However, it is not considered that a submitted CCTV image is obtained by copying an original image with complete fidelity because the CCTV image has already been copied a couple of times".

Therefore, evidence management technology for verifying identify, authenticity, and integrity and securing objectivity in material provision processes, all of which are necessary during investigation procedures using CCTV images, is being developed, and a prior art, Korean Patent No. 10-08222790, discloses a system and a method for providing forgery/alteration protective proof data against illegal reproductions. A system for providing proof data against illegal reproductions through a web server connected to a network includes: a personal terminal that is connected to the web server to generate the proof data against illegal reproductions and transmits the proof data to the web server; an original copy server that receives the proof data and generates duplicated proof data in cooperation with the web server, performs hashing and encoding on the proof data, stores the encoded proof data, decodes the encoded proof data at the request of an authenticated personal terminal, and transmits the decoded proof data to the personal terminal; and a duplicate server that receives the duplicated proof data from the original copy server, stores the received duplicated proof data, and transmits the stored duplicated proof data to the personal terminal at the request of the personal terminal.

Also, a method of providing proof data against illegal reproductions through a web server connected to a network includes: transmitting proof data generated through the web server, to an original copy server; duplicating the proof data transmitted to the original copy server to generate duplicated proof data and performing hashing on the proof data; encoding the hashed proof data and storing the encoded proof data in an original copy database; and receiving a request for the proof data from a personal terminal accessing the original copy server, extracting the proof data stored in the original copy database when the personal terminal is authenticated through authentication, decoding the extracted proof data, transmitting the decoded proof data.

The system and method of the prior art is to prevent forgery and alteration of proof data against illegal reproductions spread on the Internet by allowing the proof data to have integrity and confidentiality and to utilize the proof data having security as authorized proof data in legal proceedings for the illegal reproductions. However, the prior art fails to verify that a duplicate image has authenticity and integrity when an original image generated by an image storage device is copied by an image collecting device.

DETAILED DESCRIPTION OF THE INVENTION

Technical Problem

Therefore, the present disclosure is designed to solve the aforementioned problems and aims at verifying authentication and integrity of an image obtained by duplicating an original image.

Technical Solution

According to an embodiment of the present disclosure, there is provided a duplicate image evidence management system for verifying authentication and integrity, the duplicate image evidence management system including: an image generating unit configured to generate an original image; a hash generating unit configured to generate an original hash value for the original image; a hash checking unit configured to check whether the original hash value is changed; and a duplicate image generating unit configured to, when it is checked by the hash checking unit that the original hash value is not changed, generate a first duplicate image by copying the original image and generate a first hash value for the first original image.

When the original hash value is changed, the hash checking unit may be further configured to allow the original image to be copied and generate log information regarding the change in the original hash value.

The duplicate image evidence management system may further include a time correction unit configured to generate a time correction value used to correct a difference between standard time and time when the image generating unit generates the original image.

When the image generating unit generates the original image in a volume unit, the hash generating unit may change the original image to be in a file unit and may generate the original hash value for the original image in the file unit.

The duplicate image evidence management system may further include a duplicate image database configured to receive the first duplicate image including the first hash value from the duplicate image generating unit, database the first duplicate image, generate a second duplicate image converted from the first duplicate image, and database the second duplicate image including a second hash value when the second hash value for the second duplicate image is generated.

The duplicate image evidence management system may further include a client unit configured to receive a database of the first duplicate image from the duplicate image database, generate the second duplicate image converted from the first duplicate image, generate the second hash value indicating that the second duplicate image is converted from the first duplicate image, and transmit the second duplicate image including the second hash value to the duplicate image database.

According to another embodiment of the present disclosure, there is provided an image storage device included in the above duplicate image evidence management system, wherein the image storage device is configured to: generate an original image; generate an original hash value for the original image; check whether the original hash value is changed; and allow the original image to be copied when the original hash value is not changed.

According to another embodiment of the present disclosure, there is provided an image collecting device included in the above duplicate image evidence management system, wherein the image collecting device is configured to: generate a first duplicate image obtained by copying an original image when it is checked that an original hash value for the original image is not changed; and generate a first hash value for the first duplicate image to generate the first duplicate image including the first hash value.

According to another embodiment of the present disclosure, there is provided a duplicate image evidence management system for verifying authentication and integrity, the duplicate image evidence management system including: an image storage device configured to generate an original image and an original hash value for the original image; an agent configured to check whether the original hash value of the image storage device is changed and allow the original image to be copied when the original hash value is not changed; and an image collecting device configured to generate a first duplicate image obtained by copying the original image from the image storage device when it is checked by the agent that the original hash value is not changed, generate a first hash value for the first duplicate image, and generate the first duplicate image including the first hash value.

The agent may be further configured to allow the original image to be copied when the original hash value is changed and generate log information regarding the change in the original hash value.

The duplicate image evidence management system may further include a time correction unit configured to generate a time correction value used to correct a difference between standard time and time when the image storage device generates the original image.

When the image storage device generates the original image in a volume unit, the agent may be further configured to change the original image to be in a file unit and generate an original hash value for the original image in the file unit.

The duplicate image evidence management system may further include a server configured to: receive the first duplicate image including the first hash value from the image collecting device to database the first duplicate image; generate a second duplicate image converted from the first duplicate image; when a second hash value for the second duplicate image is generated, database the second duplicate image including the second hash value.

The duplicate image evidence management system may further include a client configured to: receive a database of the first duplicate image from the server and generate a second duplicate image converted from the first duplicate image; generate a second hash value indicating that the second duplicate image is converted from the first duplicate image; and transmit the second duplicate image including the second hash value to the server.

According to another embodiment of the present disclosure, there is provided a duplicate image evidence management system for verifying authentication and integrity, the duplicate image evidence management system including: a storage medium configured to store an original image; a hash generating device configured to receive the original image from the storage medium and generate an original hash value for the original image; an agent configured to check whether the original hash value is changed; an image collecting device configured to generate a first duplicate image, which is obtained by copying the original image from the hash generating device, when the original hash value is not changed, generate the first hash value for the first hash value, and generate the first duplicate image including the first hash value; and a server configured to receive the first duplicate image including the first hash value from the image collecting device so as to database the first duplicate image and, when a second duplicate image converted from the first duplicate image is generated, configured to generate a second hash value indicating that the second duplicate image is converted from the first duplicate image.

The server may be further configured to assign a first code to the first duplicate image including the first hash value, assign a second code, which is subordinate to the first code, to the second duplicate image including the second hash value, and group the first and second codes so as to create a history database.

The duplicate image evidence management system may further include a client configured to: receive the first duplicate image including the first hash value from the server; generate the second duplicate image converted from the first duplicate image; generate the second hash value indicating that the second duplicate image is converted from the first duplicate image; and transmit the second duplicate image including the second hash value to the server.

According to another embodiment of the present disclosure, there is provided a duplicate image evidence management system for verifying authentication and integrity, the duplicate image evidence management system including: an image storage device configured to generate an original image and an original hash value for the original image; and a server configured to: generate a first duplicate image obtained by copying the original image when it is checked whether the original hash value is changed and it is determined that the original hash value is not changed; generate a first hash value for the first duplicate image and generate the first duplicate image including the first hash value; database the first duplicate image including the first hash value; when a second duplicate image converted from the first duplicate image is generated, generate a second hash value indicating that the second duplicate image is converted from the first duplicate image; and generate the second duplicate image including the second hash value.

The server may be further configured to: assign a first code to the first duplicate image including the first hash value; assign a second code to the second duplicate image including the second hash value, the second code being subordinate to the first code; and group the first code and the second code to create a history database.

The duplicate image evidence management system may further include a client configured to: receive the first duplicate image including the first hash value from the server; generate the second duplicate image converted from the first duplicate image; generate the second hash value indicating that the second duplicate image is converted from the first duplicate image; and transmit the second duplicate image including the second hash value to the server.

Advantageous Effects of the Invention

As described above, authentication and integrity of a duplicate image, which is obtained by copying an original image, may be verified, and thus, the duplicate image, which is worth being used as evidence, may be used for various types of investigations.

MODE OF THE INVENTION

The present disclosure will now be described more fully with reference to the accompanying drawings, in which embodiments of the present disclosure are shown.

Figure 1:
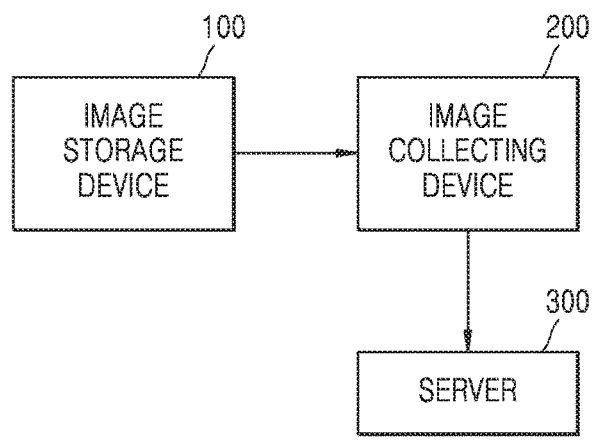
FIG. 1 is a diagram illustrating a structure of a duplicate image evidence management system for verifying authentication and integrity, according to an embodiment of the present disclosure.

FIG. 1 is a diagram illustrating a structure of a duplicate image evidence management system for verifying authentication and integrity, according to an embodiment of the present disclosure. The duplicate image evidence management system for verifying authentication and integrity includes an image storage device 100, an image collecting device 200, and a server 300. Here, the term "authentication" means that captured images contain images of actual scenes, and the term "integrity" means that all captured images are not altered or counterfeited during all processes from acquisition to submission of the captured images. Throughout the specification, definitions of the above terms do not change.

In more detail, the image storage device 100 includes an agent that generates an original image, generates a first hash value for the original image, and checks whether the first hash value is changed before the original image is copied.

That is, the original image loses its value as evidence when any changes are made to the original image due to certain manipulations because such changes indicate that the original image is counterfeited. In this case, the original image is not copied. However, when the original image is not counterfeited, the original image is still worth being used as evidence, the original image may be copied.

In this case, since the first hash value is changed when the original image is counterfeited and the first hash value remains unchanged when the original image is not counterfeited, the image storage device 100 checks whether the first hash value is changed before the original image is copied so as to determine whether the original image is counterfeited.

Accordingly, when the original image is not counterfeited at all, the agent intactly copies a hash value which is not changed. Also, when changes such as damage, change, deletion, and correction are made to the original image via local connection or remote connection, a counterfeit original image may have a changed hash value, and when the counterfeit original image is copied, the changed hash value is copied.

As described above, a process of checking whether an original image is counterfeited is to verify that, when the original image is copied, a duplicate image has authentication and integrity.

A representative example of the image storage device 100 is a camera including a Network Video Recorder (NVR), a Digital Video Recorder (DVR), and a storage medium.

The image storage device 100 further includes a storage unit in which stored data is not lost even though a certain period of time has passed, and thus the storage unit stores therein the original image that is copied by the image collecting device 200.

For example, when it is difficult to calculate a minimum period of time to retain image information, the image information is generally set to be deleted according to retention and deletion guidelines specifying that image information is retained for at most 30 days after it is collected. However, a copied original image is valuable evidence, and the image storage device 100 includes the storage unit in which the copied original image is not deleted even though a certain period of time has passed. Accordingly, the image storage device 100 retains the original image.

Also, when the original image is stored in a volume unit, the agent of the image storage device 100 changes the original image to be stored in a file unit and generates a first hash value at the same time when the image collecting device 200 copies the original image.

For example, the image storage device 100 always stores the original image in a volume unit, not a file unit. However, since it is unnecessary to provide the image collecting device 200 with a portion of the original image, which is not used as evidence, the agent changes the original image to be stored in a file unit when the image collecting device 200 copies the original image, thereby generating the first hash value.

The image collecting device 200 includes a standard time module, and when the original image in the image storage device 100 is copied, the image collecting device 200 generates a time correction value, which corresponds to a difference between standard time measured by the standard time module and time measured by the image storage device 100, and a duplicate image including the first hash value. When the duplicate image is transmitted, the duplicate image is automatically deleted after the transmission is completed.

In other words, the reason why the image collecting device 200 includes the standard time module is that, since points in time measured by respective image storage devices 100 are slightly different from one another, the image collecting device 200 generates the time correction value corresponding to the difference between the standard time and the time of each image storage device 100 by comparing the standard time with the time of the image storage device 100, and thus, each image storage device 100 obtains a duplicate image based on the standard time.

Figure 2:
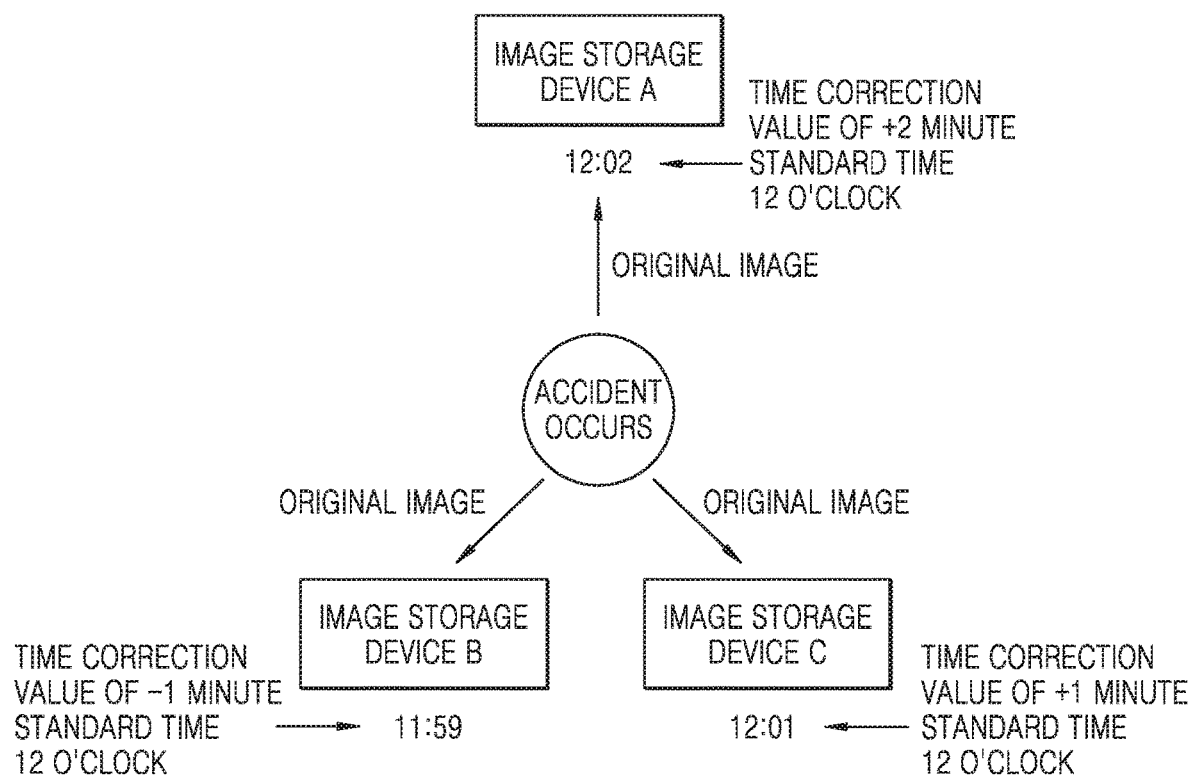
FIG. 2 illustrates an example of a time correction value according to an embodiment of the present disclosure.

For example, as illustrated in FIG. 2, when an image storage device A, an image storage device B, and an image storage device C generate original images containing accident scenes, if the image storage devices A to C generate the original images at 12:02, 11:59, and 12:01, respectively, while each of the image storage devices A to C counts its own time, a time correction value of the original image generated at 12:02 is +2 minutes, a time correction value of the original image generated at 11:59 is −1 minute, and a time correction value of the original image generated at 12:01 is +1 minute when the standard time of each of the image storage devices A to C is 12 o'clock.

As described above, the image collecting device 200 has the time correction value of +2 minutes when copying the original image from the image storage device A, the time correction value of −1 minute when copying the original image from the image storage device B, and the time correction value of +1 minute when copying the original image from the image storage device C.

Therefore, if, in order to collect the original images generated at 12 o'clock that is the standard time, the image collecting device 200 collects the original image which is generated by the image storage device A at 12:02 reflecting the time correction value of +2 minutes thereto, the original image which is generated by the image storage device B at 11:59 reflecting the time correction value of −1 minute thereto, and the original image which is generated by the image storage device C at 12:01 reflecting the time correction value of +1 minute thereto, it is considered that original images captured and generated at the same time are copied.

The reason why the duplicate images are automatically deleted after the duplicate images finish being transmitted is to prevent the duplicate images from being used for other purposes except for collection of evidence by the police or prosecution. Therefore, the duplicate images are automatically deleted after being transmitted to the server 300.

In addition, when copying the original images, the image collecting device 200 may input, to the duplicate images including the first hash values, locations where the original images are collected, file sizes, the number of people who collected the original images, and play time.

For example, investigators generally use the image collecting device 200 to copy original images, and while the original images are copied, information such as file sizes, the number of people who collected the original images (the number of investigators when copying the original images), and play time are input to the duplicate images in order to verify that the duplicate images are useful during the investigation and are identical to the original images.

The server 300 receives the duplicate images including the first hash values from the image collecting device 200 and converts the duplicate images into duplicate image data that is in a form of a database.

That is, as the server 300 databases the duplicate images that are obtained by copying the original images and have authentication and integrity, the server 300 is capable of providing the duplicate images that are worth being used as evidence to servers or clients of other agencies.

Meanwhile, the server 300 synthesizes the duplicate images, which are received from different image storage devices and databased, into one duplicate synthesis image.

Figure 3:
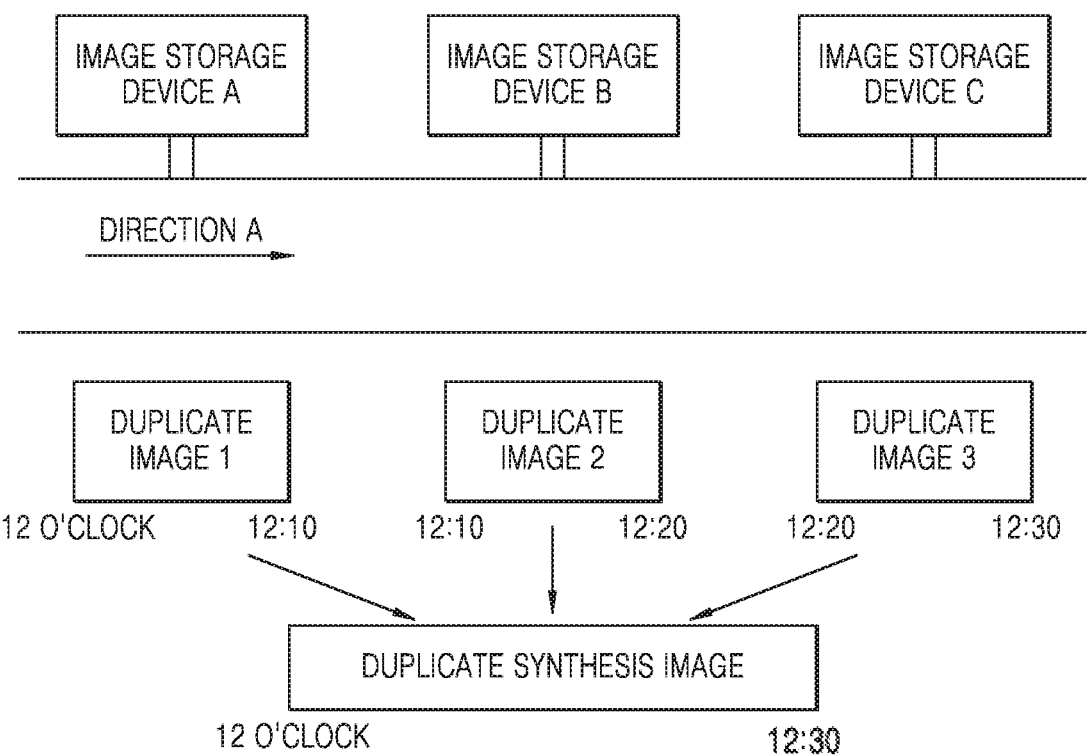
FIG. 3 illustrates an example of an image obtained by synthesizing duplicate images, according to an embodiment of the present disclosure.

For example, since the original images stored in the image storage devices A to C are databased as the duplicate images, if a criminal runs away in a direction A of FIG. 3, the server 300 extracts duplicate images, which are captured by the image storage device A from 12 o'clock to 12:10, duplicate images, which are captured by the image storage device B from 12:10 to 12:20, and duplicate images, which are captured by the image storage device C from 12:20 to 12:30, from the duplicate images captured by the image storage devices A to C and databased, and then the server 300 synthesizes the duplicate images captured for 30 minutes from 12 o'clock into one duplicate synthesis image. Therefore, the server 300 uses the duplicate synthesis image to check a route that the criminal may possibly take to run away and uses the duplicate synthesis image as evidence.

Figure 4:
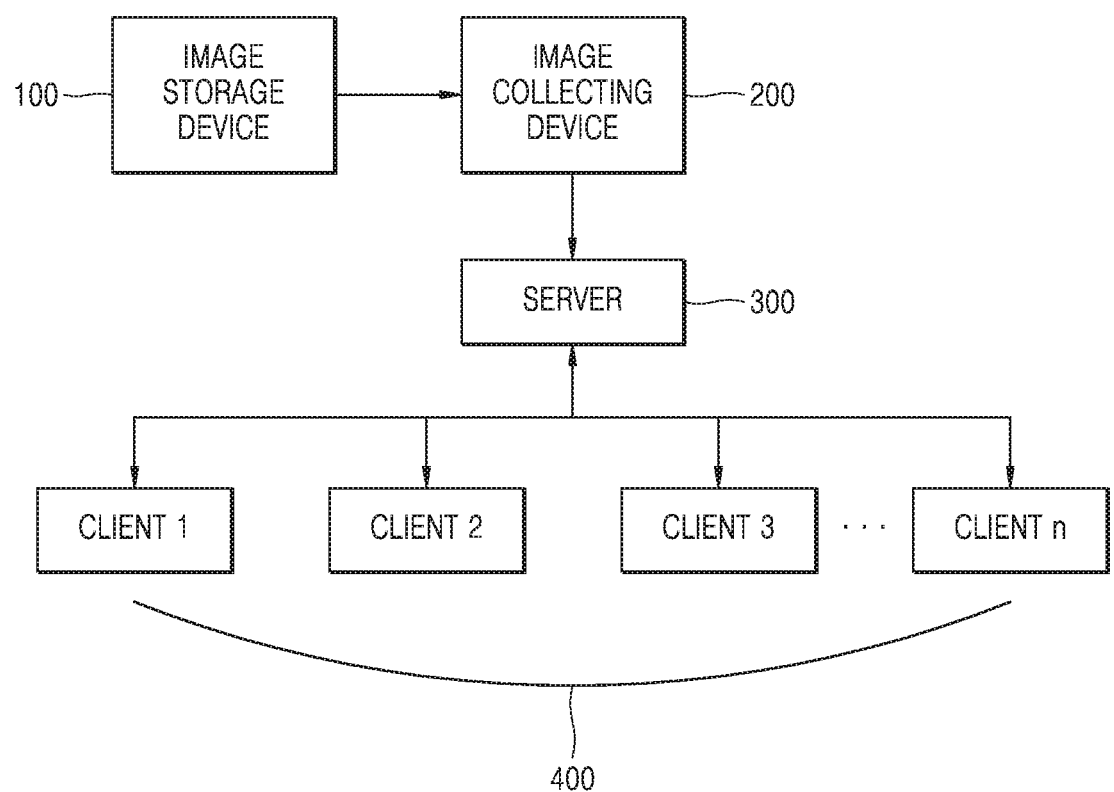
FIG. 4 is a diagram illustrating a structure of a duplicate image evidence management system for verifying authentication and integrity, according to another embodiment of the present disclosure.

FIG. 4 is a diagram illustrating a structure of a duplicate image evidence management system for verifying authentication and integrity, according to another embodiment of the present disclosure. The duplicate image evidence management system includes the image storage device 100, the image collecting device 200, the server 300, and clients 400.

In more detail, descriptions of the image storage device 100 and the image collecting device 200 are similar to or the same as the descriptions of the image storage device 100 and the image collecting device 200 which are provided with reference to FIGS. 1 and 2, and thus, repeated descriptions will be omitted. The image storage device 100 further includes the storage unit in which stored data is not lost even though a certain period of time has passed, and the storage unit stores therein original images that are copied by the image collecting device 200.

For example, when it is difficult to calculate a minimum period of time to retain image information, the image information is generally set to be deleted according to retention and deletion guidelines specifying that image information is retained for at most 30 days after it is collected. However, copied original images are valuable evidence, and the image storage device 100 includes the storage unit in which the copied original images are not deleted even though a certain period of time has passed. Accordingly, the image storage device 100 retains the original images.

Also, when the original images are stored in a volume unit, the agent of the image storage device 100 changes the original images to be stored in a file unit and generates first hash values at the same time when the image collecting device 200 copies the original images.

For example, the image storage device 100 always stores the original images in a volume unit, not a file unit. However, since it is unnecessary to provide the image collecting device 200 with portions of the original image, which are not used as evidence, the agent changes the original images to be stored in a file unit when the image collecting device 200 copies the original images, thereby generating the first hash values.

Hereinafter, the clients 400 and the server 300 will be described in detail.

The server 300 receives the duplicate images including the first hash values from the image collecting device 200 and converts the duplicate images into duplicate image data that is in form of a database.

The clients 400 receive the duplicate image data and make alterations thereto so as to generate second hash values indicating that the alterations are made to the duplicate image data including the first hash values, and the clients 400 repeatedly transmit the second hash values, and the standard time and the time correction values, which are continuously generated together with the second hash values, to the server 300.

That is, each client 400 receives the duplicate image data from the server 300 and makes alterations such as extraction, masking, edition to the duplicate image data so as to generate altered second hash values, and since points in time when the clients are driven are different from one another like the points in time measured by the image storage devices are different from each other, the standard time, the time correction values, and the second hash values are transmitted together.

Figure 5:
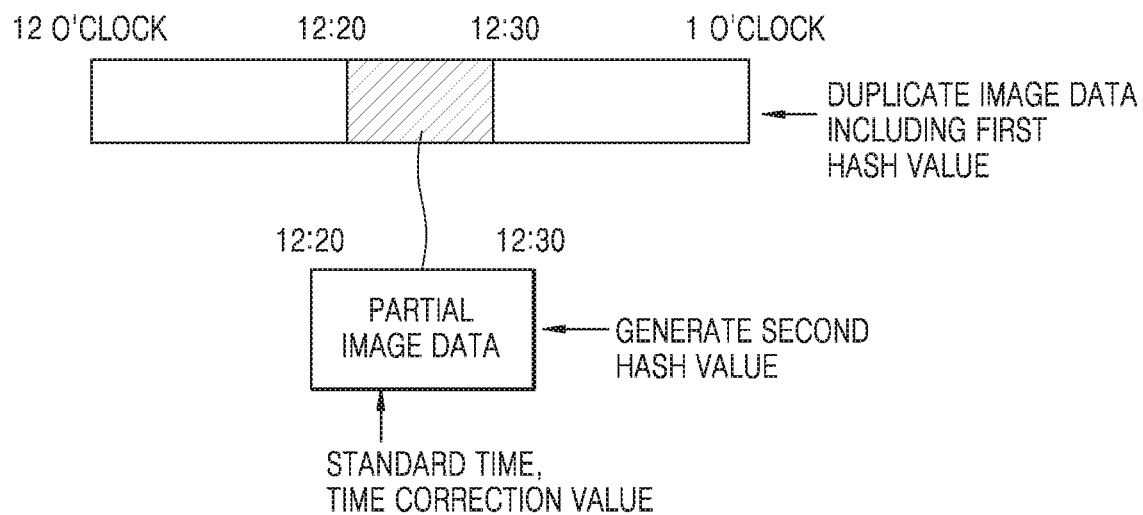
FIG. 5 illustrates an example in which authentication and integrity of duplicate image data are verified with respect to an original image when the duplicate image data is extracted, according to an embodiment of the present disclosure.

For example, the clients 400 are described with reference to the example of FIG. 5, and when the duplicate image data including the first hash value is played from 12 o'clock to 1 o'clock, the clients 400 extract portions of the duplicate image data, which are from 12:20 to 12:30 and directly relevant to the investigation, to generate partial image data and include second hash values, which indicate that the portions are extracted from the duplicate image data including the first hash values, in the partial image data, thereby verifying the authentication and the integrity with respect to the original images.

Since the duplicate image data played from 12 o'clock to 1 o'clock includes the first hash values, the authentication and the integrity with respect to the original images are verified. Also, as the second hash values indicating that the portions are extracted from the duplicate image data including the first hash value are included in the partial image data, the authentication and the integrity with respect to the original images are verified.

In this case, the partial image data includes the standard time and the time correction values.

Figure 6:
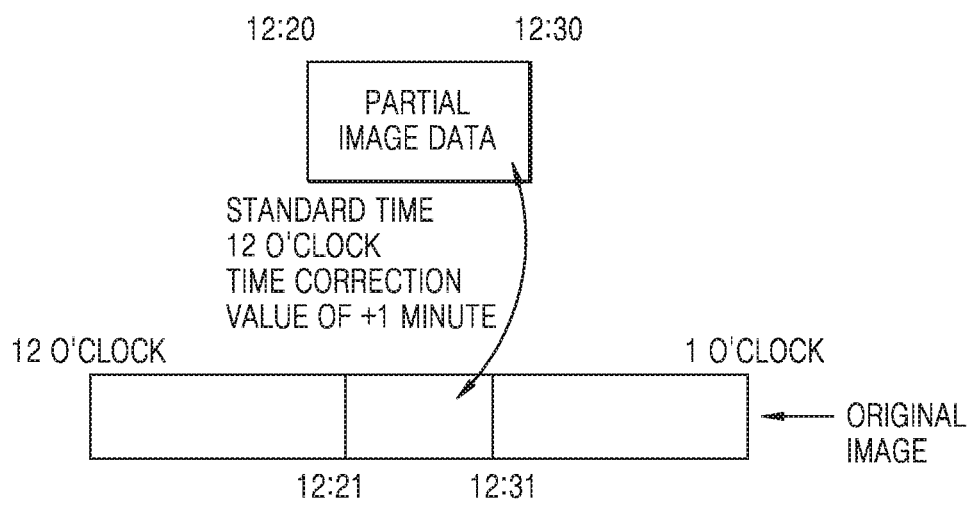
FIG. 6 illustrates an example in which authentication and integrity of partial image data are verified with respect to an original image, according to an embodiment of the present disclosure.

For example, as illustrated in FIG. 6, when the partial image data is extracted from the portions of the duplicate image data which are from 12:20 to 12:30, the standard time is 12 o'clock, and the time correction value is +1 minute, the partial image data corresponds to the original images captured at 12:21 to 12:31 based on the standard time and the time correction value, and the authentication and integrity of the partial image data are verified by using the first and second hash values.

Meanwhile, the server 300 assigns a code to the duplicate image data including the first hash value, respectively assigns subordinate codes, which are subordinate to the code, to the hash values continuously generated by the clients 400, and creates a history database by grouping the code and the subordinate codes.

Figure 7:
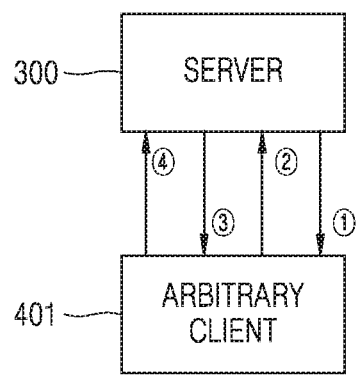
FIG. 7 illustrates an example in which a history of duplicate image data is constructed as a database, according to an embodiment of the present disclosure.

For example, referring to FIG. 7, in the case of ① of FIG. 7(a) where an arbitrary client 401 receives duplicate image data having a hash 1 from the server 300, a code A is assigned to the duplicate image data as in the example i) of FIG. 7(a), and thus, the arbitrary client 401 receives the duplicate image data and the hash 1.

In this case, when the arbitrary client 401 makes an alteration such as extraction, masking, or edition to the example i), a hash 2 is generated as in the example ii) of FIG. 7(b). The example ii) of FIG. 7(b) is transmitted to the server 300 and databased therein as in the case of ② of FIG. 7(a).

In the case ③ of FIG. 7(a), when the arbitrary client 401 and another arbitrary client receive the example ii) of FIG. 7(b) and make an alteration such as extraction, masking, or edition to the example ii) again, a hash 3 is generated as in the example iii) of FIG. 7(b). The example iii) of FIG. 7(b) is transmitted to the server 300 and databased therein as in the case of ④ of FIG. 7(a).

As illustrated in FIG. 7(c), the server 300 and the clients 400 continuously and repeatedly perform the above processes so as to group the duplicate image data having the hash 1 included in the code A and duplicate image data having hash values, which are respectively included in a subordinate code A' and a code A". Accordingly, a history database including a history of the duplicate image data is constructed.

Therefore, no matter what alterations are made to the duplicate image data by the clients 400, the history includes the first hash value and shows that alterations have been made based on the first hash value, and thus the history database may be used to verify authentication and integrity of the duplicate image data.

For example, alterations are made by authorities connected to the police, the prosecution, or courts so as to use generated hash values as evidence, and thus, it is possible to check, based on the history database, a history showing which authority makes an alteration to a hash value to use the same as evidence.

Meanwhile, the server 300 synthesizes the duplicate images, which are received from different image storage devices and databased, into one duplicate synthesis image.

The production of one duplicate synthesis image has already been described above with reference to FIG. 3, and thus, descriptions thereof will not be repeated herein.

Figure 8:
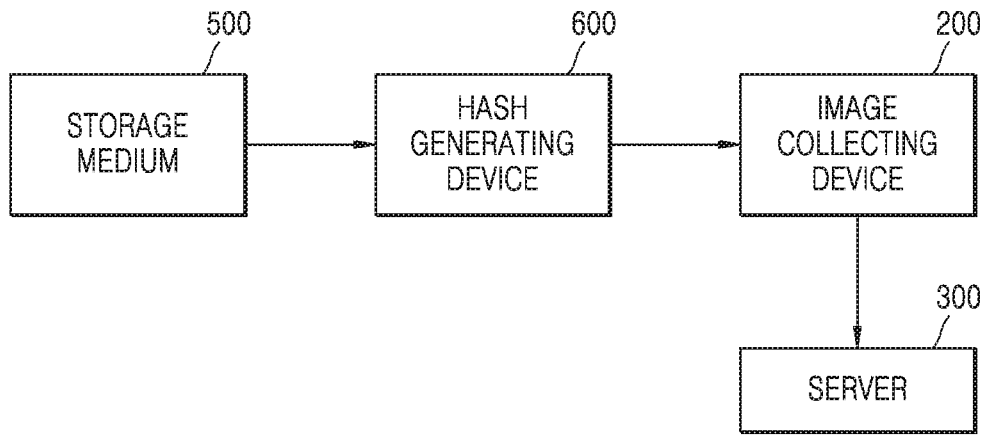
FIG. 8 or 9 is a diagram illustrating a structure of a duplicate image evidence management system for verifying authentication and integrity, according to another embodiment of the present disclosure.

FIG. 8 is a diagram illustrating a structure of a duplicate image evidence management system for verifying authentication and integrity, according to another embodiment of the present disclosure. The duplicate image evidence management system includes a storage medium 500, hash generating devices 600, the image collecting device 200, and the server 300.

In more detail, the storage medium 500 stores original images.

For example, the storage medium 500 is embedded in a dashboard camera, a digital camera, a mobile phone, a closed-circuit television (CCTV), or the like, in a form of a memory card or a memory chip and stores the original images.

The hash generating device 600 includes an agent that generates a first hash value for the original image at a point in time when the original image is received, includes the first hash value in the original image, and checks whether the first hash value is changed before the original image is copied.

That is, since the original image stored in the storage medium 500 does not have a hash value, the hash generating device 600 includes the first hash value in the original image in order to verity authentication and integrity of a duplicate image obtained by copying the original image.

The original image loses its value as evidence when any changes are made to the original image due to certain manipulations because such changes indicate that the original image is counterfeited, and in this case, the original image is not copied. However, when the original image is not counterfeited, the original image is still worth being used as evidence, the original image is copied. Therefore, the agent of the hash generating device 600 checks a change in the first hash value before the original image is copied so that a determination as to whether the original image is not counterfeited may be made.

When the image collecting device 200 includes the standard time module and copies the original images to generate the first hash values with the hash generating device 600, the image collecting device 200 generates time correction values corresponding to differences between the standard time of the standard time module and time of the hash generating devices 600, and the duplicate image including the first hash values. When the duplicate images are transmitted, the duplicate images are automatically deleted after the transmission is completed.

That is, since points in time measured by respective hash generating devices 600 are slightly different from one another, the image collecting device 200 generates a time correction value corresponding to a difference between the standard time and the time of each hash generating device 600 by comparing the standard time and the time of each hash generating device 600, and thus, the hash generating devices 600 obtain duplicate images based on the standard time.

Also, the reason why the duplicate images are automatically deleted after the duplicate images finish being transmitted is to prevent the duplicate images from being used for other purposes except for collection of evidence by the police or prosecution. Therefore, the duplicate images are automatically deleted after being transmitted to the server 300.

In addition, when copying the original images, the image collecting device 200 may input, to the duplicate images including the first hash values, locations where the original images are collected, file sizes, the number of people who collected the original images, and play time.

For example, investigators generally use the image collecting device 200 to copy original images, and while the original images are copied, information such as file sizes, the number of people who collected the original images (the number of investigators when copying the original images), and play time are input to the duplicate images in order to verify that the duplicate images are useful during the investigation and are identical to the original images.

The server 300 receives the duplicate images including the first hash values from the image collecting device 200 and converts the duplicate images into duplicate image data in a database form.

That is, as the server 300 databases the duplicate images that are obtained by copying the original images and have authentication and integrity, the server 300 is capable of providing the duplicate images that are worth being used as evidence to servers or clients of other agencies.

Meanwhile, the server 300 synthesizes the duplicate images, which are received from different image storage devices and databased, into one duplicate synthesis image.

The production of one duplicate synthesis image has already been described above with reference to FIG. 3, and thus, descriptions thereof will not be repeated herein.

Figure 9:
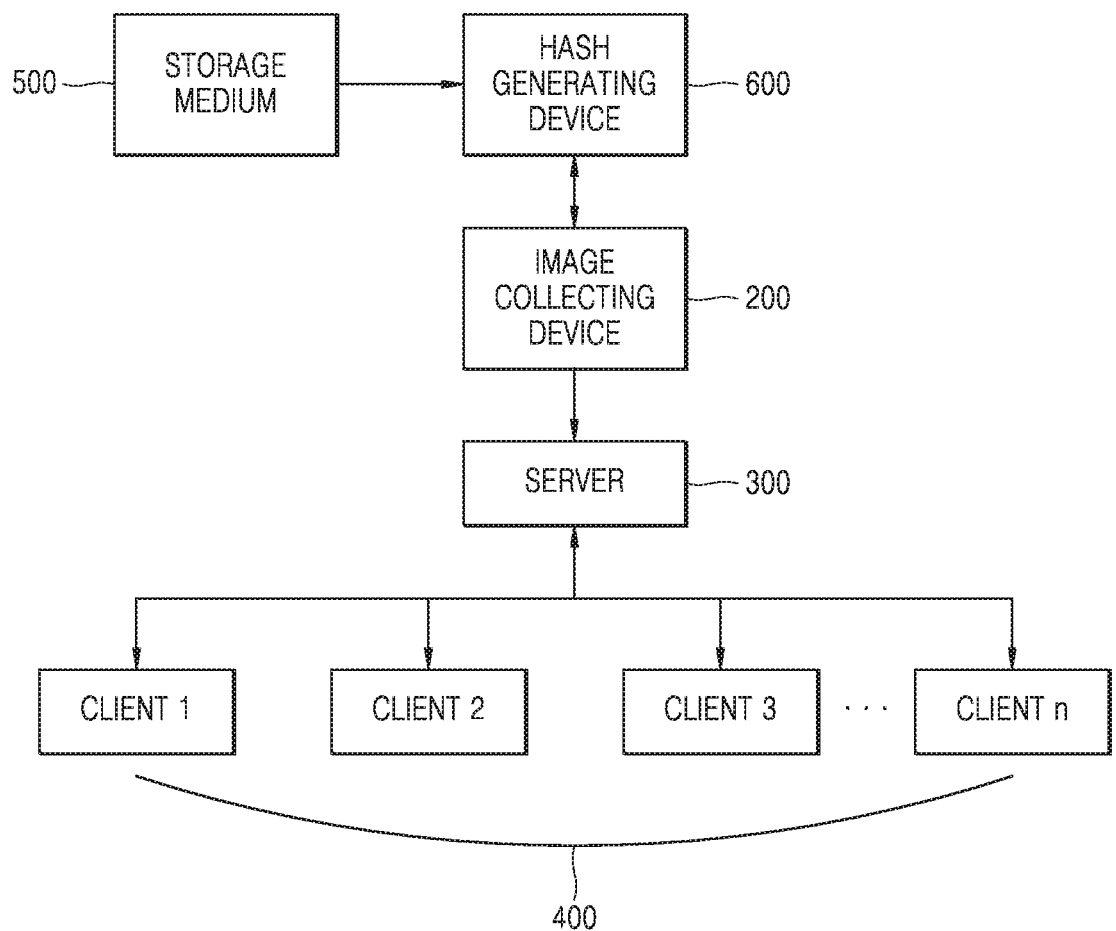

FIG. 9 is a diagram illustrating a structure of a duplicate image evidence management system for verifying authentication and integrity, according to another embodiment of the present disclosure. The duplicate image evidence management system includes the storage medium 500, the hash generating device 600, the image collecting device 200, the server 300, and the clients 400.

In more detail, descriptions of the storage medium 500, the hash generating device 600, and the image collecting device 200 are similar to or the same as the descriptions of the storage medium 500, the hash generating device 600, and the image collecting device 200 which are provided with reference to FIG. 8, and thus, repeated descriptions will be omitted.

The server 300 receives the duplicate images including the first hash values from the image collecting device 200 and converts the duplicate images into duplicate image data that is in a form of a database.

The clients 400 receive the duplicate image data and make alterations thereto so as to generate second hash values indicating that the duplicate image data is converted from the duplicate images including the first hash values, and the clients 400 transmit hash values, which are continuously generated by repeatedly transmitting the second hash values to the server 300, the standard time, and the time correction values to the server 300.

That is, each client 400 receives the duplicate image data from the server 300 and makes alterations such as extraction, masking, edition to the duplicate image data so as to generate altered second hash values, and since points in time when the clients are driven are different from one another like the points in time measured by the image storage devices are different from each other, the standard time, the time correction values, and the second hash values are transmitted together.

Meanwhile, the server 300 assigns a code to the duplicate image data including the first hash value, respectively assigns subordinate codes, which are subordinate to the code, to the hash values continuously generated by the clients 400, and creates a history database by grouping the code and the subordinate codes.

The creation of the history database has already been described above with reference to FIG. 7, and thus, descriptions thereof will not be repeated herein.

Meanwhile, the server 300 synthesizes the duplicate images, which are received from different image storage devices and databased, into one duplicate synthesis image.

The production of one duplicate synthesis image has already been described above with reference to FIG. 3, and thus, descriptions thereof will not be repeated herein.

Figure 10:
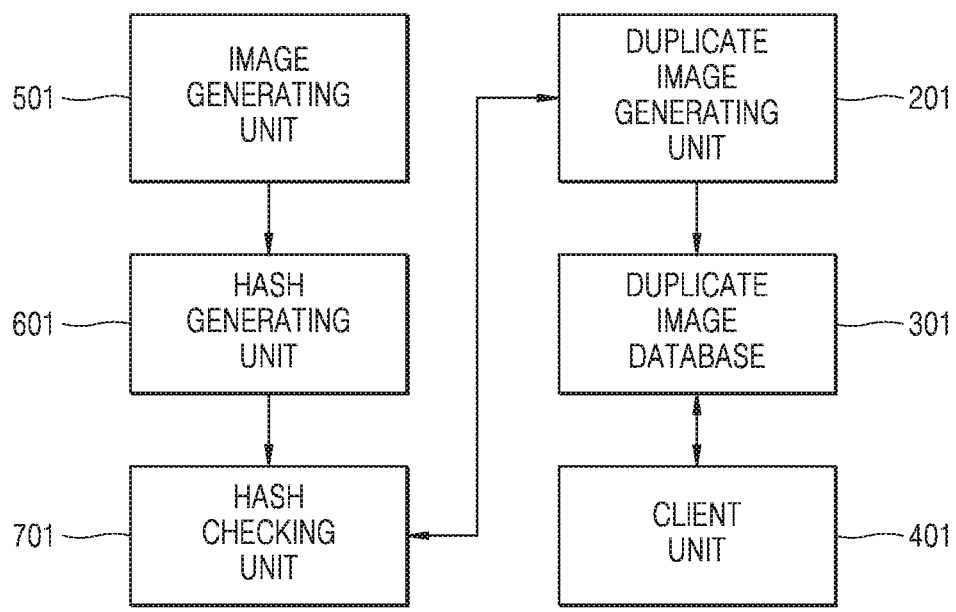
FIG. 10 is a diagram illustrating a structure of a duplicate image evidence management system for verifying authentication and integrity, according to another embodiment of the present disclosure.

A duplicate image evidence management system for verifying authentication and integrity according to another embodiment of the present disclosure includes an image generating unit, a hash generating unit, a hash checking unit, and a duplicate image generating unit. An example of the duplicate image evidence management system according to the present embodiment is illustrated in FIG. 10.

The image generating unit 501 generates original images. The image generating unit 501 may be included in an image generating device for capturing an object and generating moving or still images, and examples of the image generating device include a CCTV, a network camera, a camera on a mobile phone, and a dashboard camera.

The original images generated by the image generating unit 501 are stored in a storage device such as a memory card or a memory chip for a certain period of time, for example, one week, one month, etc., depending on purposes of the original images. In this case, the original images may be stored in the storage device in a volume unit or a file unit. The storage device may be separate from the image generating device, but may be included therein.

The hash generating unit 601 generates original hash values for the original images. For example, the hash generating unit 601 applies a hash function to the original images generated by the image generating unit 501 and generates the original hash values. The original hash values are stored in a storage device such as a memory card or a memory chip for a certain period of time, for example, one week, one month, etc., or in a separate external server connected to the storage device, depending on the purposes of the original hash values. The hash generating unit 601 may be included in the image generating device. Thus, a possibility that the original images generated by the image generating unit 601 are counterfeited may be fundamentally prevented.

The hash generating unit 601 may apply a hash function to the original images stored in the storage device and may generate the original hash values. In this case, when the original images are stored in the storage device in a volume unit, the hash generating unit 601 may change the original images to be stored in a file unit and thus may generate the original hash values. The original hash values are stored in a storage device such as a memory card or a memory chip for a certain period of time, for example, one week, one month, etc., or in the separate external server connected to the storage device, depending on the purposes of the original hash values. The hash generating unit 601 may be included in the storage device. Accordingly, since the image generating device does not need to generate first hash values for the original images, load on the image generating device may greatly decrease.

The hash checking unit 701 checks whether the original hash values are changed. The hash checking unit 701 checks whether the original hash values, which are generated by the hash generating unit 601 and stored in the storage device, are changed. Thus, the hash checking unit 701 may check whether the original images corresponding to the original hash values are counterfeited.

To check whether all of the original images are counterfeited like counterfeiting of all original image files is checked, the hash checking unit 701 may check whether all of corresponding original hash values are changed. However, the present disclosure is not limited thereto. To check whether some of the original images are counterfeited like counterfeiting of some original image files is checked, the hash checking unit 701 may check whether some of corresponding original hash values are changed. The hash checking unit 701 may be included in the image generating device or the storage device.

When it is checked that the original hash values are changed, the original images corresponding to the original hash values are considered to be counterfeited, the hash checking unit 701 does not allow the original images to be copied. When it is checked that the original hash values are not changed, the original images corresponding to the original hash values are considered not to be counterfeited, the hash checking unit 701 allows the original images to be copied. The original images are allowed to be copied only when the original images are not counterfeited, and thus counterfeiting of the original images is fundamentally prevented. However, the present disclosure is not limited thereto. When the hash checking unit 701 checks that the hash values are changed, the original images are allowed to be copied, and log information regarding counterfeiting may be generated.

When it is checked by the hash checking unit 701 that the original hash values are changed, the duplicate image generating unit 201 generates first duplicate images obtained by copying the original images and generates first hash values for the first duplicate images, thereby generating the first duplicate images including the first hash values. Therefore, authentication and integrity of the first duplicate images may be secured.

The duplicate image generating unit 301 may be included in a duplicate image collecting device that is separate from the image generating device and the storage device. However, the present disclosure is not limited thereto. The duplicate image generating unit 301 may be included in the image generating device or the storage device.

The first duplicate images, which include the first hash values generated by the duplicate image generating unit 301, have authentication and integrity, and authentication and integrity of second duplicate images derived from the first duplicate images are verified based on the authentication and the integrity of the first duplicate images. The first duplicate images including the first hash values may be stored in the storage device or a separate server.

In addition, the duplicate image evidence management system for verifying authentication and integrity according to the present embodiment may further include a time correction unit.

The time correction unit generates time correction values used to correct differences between standard time and time when the image generating unit 501 generates the original images. The generation of the time correction values has already been described above with reference to FIG. 2, and thus, descriptions thereof will not be repeated herein. The time correction unit may be included in the image generating device, the storage device, or a separate storage device including the duplicate image generating unit 201.

Additionally, the duplicate image evidence management system for verifying authentication and integrity according to the present embodiment may further include a duplicate image database 301. The duplicate image database 301 may receive the first duplicate images including the first hash values from the duplicate image generating unit 201 and database the first duplicate images. The duplicate image database 301 receives the first duplicate images including the first hash values from the duplicate image generating unit 201 and databases, stores, and manages the first duplicate images. Therefore, whenever clients transmit requests for the first duplicate images of which authentication and integrity are secured, the duplicate image generating unit 201 may provide the first duplicate images to the clients.

When the clients transmit the requests, the duplicate image database 301 may generate second duplicate images converted from the first duplicate images and may generate second hash values for the second duplicate images. Here, since the second duplicate images are obtained by copying the first duplicate images, it is required to additionally generate the second hash values for the second duplicate images and verify authentication and integrity of the second duplicate images to ensure that the second duplicate images are derived from the original images.

The duplicate image database 301 may database the second duplicate images including the second hash values generated as described above. Thus, whenever the clients request the second duplicate images having the verified authentication and integrity, the duplicate image database 301 may provide the second duplicate images to the clients.

Meanwhile, the duplicate image database 301 may provide the clients the first duplicate images including the first hash values at the requests of the clients. The clients may generate the second duplicate images, which are converted from the provided first duplicate images, may generate the second hash values for the second duplicate images, and may provide the duplicate image database 301 with the second duplicate images including the second hash values. Here, the second duplicate images and the second hash values therefor are generated by the clients, and the generated second duplicate images including the second hash values are databased by the duplicate image database 301.

Additionally, the duplicate image evidence management system according to the present embodiment may further include a client unit 401.

The client unit 401 may transmit a request for generation and provision of the second duplicate images converted from the first duplicate images, to the duplicate image database 301. The duplicate image database 301 may generate second duplicate images converted from the first duplicate images and may generate the second hash values for the second duplicate images at the request of the client unit 401. Here, the second duplicate images may be generated by completely or partially copying the first duplicate images. The duplicate image database 301 may provide the client unit 401 with the second duplicate images including the second hash values generated as described above and may database the second duplicate images.

On the other hand, the client unit 401 may receive a database of the first duplicate images from the duplicate image database 301, may directly generate the second duplicate images converted from the first duplicate images, and may generate the second hash values indicating that the second duplicate images are converted from the first duplicate images. The client unit 401 may transmit, to the duplicate image database 301, the second duplicate images including the second hash values generated as described above so as to allow the duplicate image database 301 to database the second duplicate images including the second hash values.

The client unit 401 may be connected to the duplicate image database 301 and may become various types of objects that require the second duplicate images of the duplicate image database 301 which are converted from the first duplicate images.

An image storage device included in a duplicate image evidence management system for verifying authentication and integrity according to another embodiment corresponds to the image storage device included in the duplicate image evidence management system for verifying authentication and integrity which is described with reference to FIG. 10.

The image storage device according to the present embodiment includes the image generating unit 501 that generates the original images and the hash generating unit 601 that generates the original hash values for the original images. The image storage device includes the hash checking unit 701 that checks whether the original hash values are changed before the original images are copied. As a result of checking whether the original hash values are changed, when the original hash values are not changed, the image storage device allows the original images to be copied. Although there is a request for copying the original images from the outside, the image storage device allows the original images to be copied only when it is checked that the original hash values are not changed, thereby securing authentication and integrity of the duplicate images obtained by copying the original images. However, the present disclosure is not limited thereto. When the hash checking unit 701 checks that a hash value is changed, the hash checking unit 701 may allow the original images to be copied and may generate log information regarding the counterfeiting.

An image collecting device included in a duplicate image evidence management system for verifying authentication and integrity according to another embodiment corresponds to the image collecting device included in the duplicate image evidence management system for verifying authentication and integrity which is described with reference to FIG. 10.

The image collecting device according to the present embodiment includes the that copies the original images when it is checked by the hash checking unit 701 that the original hash values for the original images are not changed, generates the first duplicate images, and generates the first hash values for the first duplicate images. Therefore, duplicate images having restored and checked may be generated.

A server included in a duplicate image evidence management system for verifying authentication and integrity according to another embodiment corresponds to the server included in the duplicate image evidence management system for verifying authentication and integrity which is described with reference to FIG. 10.

The server according to the present embodiment includes the duplicate image database 301 that receives the first duplicate images including the first hash values from the duplicate image generating unit 201 and databases the first hash values. The server generates the second duplicate images converted from the first duplicate images at the request of the client, and when the second hash values for the second duplicate images are generated, the server may database the second duplicate images including the second hash values. Alternatively, when the client generates the second duplicate images converted from the first duplicate images and the second hash values for the second duplicate images, the server may receive the second duplicate images including the second hash values from the client and may database the second duplicate images. Accordingly, the server may provide external devices with the first or second duplicate images having the secured authentication and integrity.

A client included in a duplicate image evidence management system for verifying authentication and integrity according to another embodiment corresponds to the client included in the duplicate image evidence management system including the server described above with reference to FIGS. 9 and 10.

The client according to the present embodiment includes the client unit 401 that receives the database of the first duplicate images from the duplicate image database and generates the second duplicate images converted from the first duplicate images. Also, the client generates the second hash values indicating that the second duplicate images are converted from the first duplicate images and transmits the second duplicate images including the second hash values to the duplicate image database.

Figure 11:
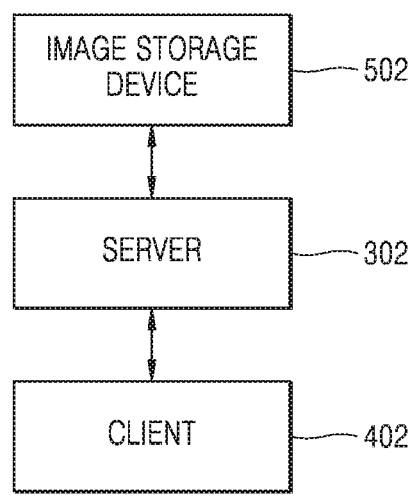
FIG. 11 is a diagram illustrating a structure of a duplicate image evidence management system for verifying authentication and integrity, according to another embodiment of the present disclosure.

A duplicate image evidence management system for verifying authentication and integrity according to another embodiment includes an image storage device and a server. An example of the duplicate image evidence management system according to the present embodiment is illustrated in FIG. 11.

The image storage device 502 generates an original image and a first hash value for the original image.

The server 302 generates a first duplicate image by copying the original image when it is checked that the original hash value is not changed and generates a first hash value for the first duplicate image. The server 302 databases the first duplicate image including the first hash value for the first duplicate image. Checking whether the original hash value is changed is performed by the server 302. However, the present disclosure is not limited thereto. The image storage device 502 may check whether the original hash value is changed before providing the server 302 with the original hash value for the original image at the request of the server 302.

Furthermore, when a second duplicate image converted from the first duplicate image is generated, the server 302 may generate a second hash value for the second duplicate image which indicates that the second duplicate image is converted from the first duplicate image. Thus, the server 302 generates the second duplicate image including the second duplicate image. The generation of the second duplicate image converted from the first duplicate image may be performed by the server 302 at the request of a client. However, the present disclosure is not limited thereto. The client, which has received the first duplicate image from the server 302 at the request of the client, may generate the second duplicate image converted from the first duplicate image and the second hash value therefor. In this case, the client provides the server 302 with the second duplicate image and the second hash value and thus allows the server 302 to database the second duplicate image including the second hash value.

Also, the server 302 may assign a first code to the first duplicate image including the first hash value and a second code, which is subordinate to the first code, to the second duplicate image including the second hash value and may group the first and second codes to create a history database. Therefore, it is easily identified that the second duplicate image is converted from which first duplicate image.

In addition, the duplicate image evidence management system according to the present embodiment may further include a client 402 that receives the first duplicate image including the first hash value from the server 302 and generates the second duplicate image converted from the first duplicate image. The client 402 may generate the second hash value for the second duplicate image which indicates that the second duplicate image is converted from the first duplicate image and may transmit the second duplicate image including the second hash value to the server 302.

Figure 12:
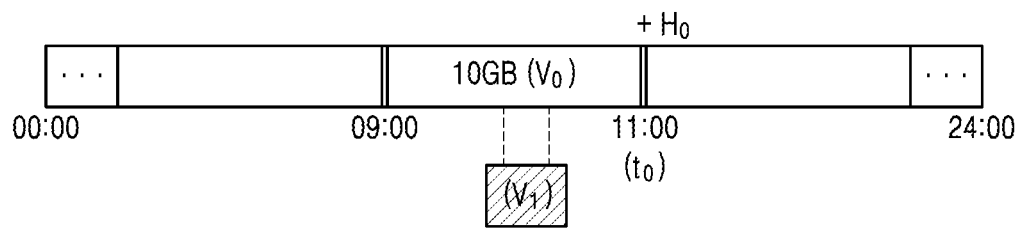
FIG. 12 is a diagram illustrating an example operation of a duplicate image evidence management system for verifying authentication and integrity, according to another embodiment of the present disclosure.
Figure 12:
Figure 12:
Figure 12:
Figure 13:
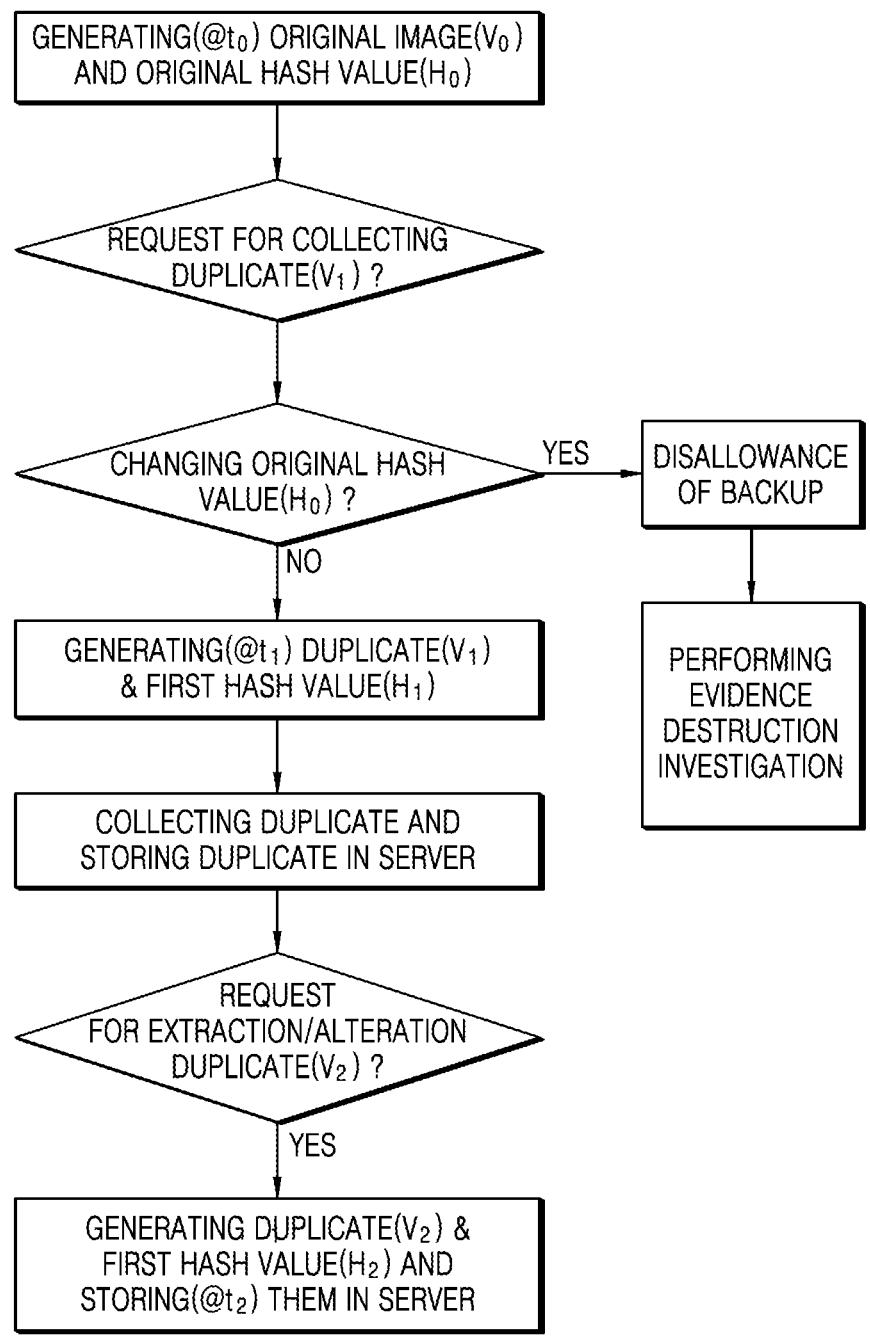
FIG. 13 is a diagram illustrating an example operation of a duplicate image evidence management system for verifying authentication and integrity, according to another embodiment of the present disclosure.

Example operations of a duplicate image evidence management system for verifying authentication and integrity according to an embodiment will be described with reference to FIGS. 12 and 13.

When an image generating unit generates original images from 00:00 to 24:00 on a certain date, a hash generating unit generates original hash values H0 for original images V0, which are generated from 09:00 to 11:00, at 11:00 t0.

When a duplicate image generating unit transmits a request for duplicate images V1, obtained by copying the original images V0, at a certain point in time t1 after a certain amount of time has passed from 11:00, a hash checking unit applies a hash function to the original images V0 at the point in time t1 and thus checks whether the original hash values H0 are changed.

In this case, when the original hash values H0 are changed, the hash checking unit does not allow the original images V0 to be copied for a backup. However, the present disclosure is not limited thereto. When the original hash values H0 are changed, the hash checking unit may allow the original images V0 to be copied and may generate log information indicating that the original images V0 may be counterfeited. Therefore, evidence may be secured by securing the original images V0, and an evident destruction investigation may be performed depending on whether the original images V0 are counterfeited.

When the original hash values H0 are not changed, the hash checking unit allows the original images V0 to be copied. Accordingly, the duplicate image generating unit generates the first duplicate images V1 obtained by copying the original images V0 and generates first hash values H1 for the first duplicate images V1. The first duplicate images V1 including the first hash values H1 generated as described above may be stored in the duplicate image generating unit or the server. Then, the first duplicate images V1 including the first hash values H1 become basic evidential materials for verifying authentication and integrity. A code A containing information regarding the first duplicate images V1 and the first hash values H1 may be stored together with the first duplicate images V1 including the first hash values H1.

After the first duplicate images V1 including the first hash values H1 are stored in the server, when an external client transmits a request for second duplicate images V2, which are converted from the first duplicate images V1 through alteration or extraction, at a certain point in time t2 after a certain period of time has passed, the server may generate the second duplicate images V2 obtained by copying the first duplicate images V1, generate second hash values H2 for the second duplicate images V2, and store the second duplicate images V2 including the first and second hash values H1 and H2, thereby providing the stored second duplicate images V2 to the external client. Moreover, a code A' containing information about the second duplicate images V2 and the second hash values H2 may be stored together with the second duplicate images V2. The generation of the second duplicate images V2 and the second hash values H2 and/or the code A' may be performed by the external client instead of the server, and the server receives information regarding such generation from the external client and stores and databases the information to manage the same.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made herein without departing from the spirit and scope as defined by the following claims.

The invention claimed is:

1. A duplicate image evidence management system for verifying authentication and integrity, the duplicate image evidence management system comprising:
   an image storage device comprising at least one processor configured to implement:
      an image generating unit configured to generate an original image;
      a hash generating unit configured to generate an original hash value for the original image;
      a hash checking unit configured to check whether the original hash value is changed; and a server comprising at least one processor configured to implement:
  a duplicate image generating unit configured to, when it is checked by the hash checking unit that the original hash value is not changed, generate a first duplicate image by copying at least a portion of the original image and generate a first hash value for the first duplicate image; and
  a duplicate image database configured to receive the first duplicate image comprising the first hash value from the duplicate image generating unit, database the first duplicate image, receive a second duplicate image converted from the first duplicate image, and database the second duplicate image comprising a second hash value when the second hash value for the second duplicate image is generated.

2. The duplicate image evidence management system of claim 1, wherein, when the original hash value is changed, the hash checking unit is further configured to generate log information regarding the counterfeiting of the original hash value.

3. The duplicate image evidence management system of claim 1, wherein the at least one processor further configured to implement a time correction unit configured to generate a time correction value used to correct a difference between standard time and time when the image generating unit generates the original image.

4. The duplicate image evidence management system of claim 1, wherein, when the image generating unit generates the original image in a volume unit, the hash generating unit changes the original image to be in a file unit and generates the original hash value for the original image in the file unit.

5. The duplicate image evidence management system of claim 1, wherein the second hash value indicates that the second duplicate image is converted from the first duplicate image.

6. The duplicate image evidence management system of claim 1, wherein the at least one processor further configured to implement a client unit configured to receive a database of the first duplicate image from the duplicate image database, generate the second duplicate image converted from the first duplicate image, generate the second hash value indicating that the second duplicate image is converted from the first duplicate image, and transmit the second duplicate image comprising the second hash value to the duplicate image database.

7. An image storage device for a duplicate image evidence management system, the image storage device comprising at least one processor configured to:
  obtain an original image;
  generate an original hash value for the original image;
  check whether the original hash value is changed; and
  allow the original image to be copied for a first duplicate image when the original hash value is not changed and a first hash value to be generated for the first duplicate image,
  wherein the first duplicate image comprising the first hash value is configured to be transmitted to a server comprising a duplicate image database in which the first duplicate image is stored and a second duplicate image converted from the first duplicate image is stored;
  wherein the second duplicate image comprises a second hash value when the second hash value for the second duplicate image is generated.

8. The image storage device for a duplicate image evidence management system of claim 7, wherein the second hash value indicates that the second duplicate image is converted from the first duplicate image.

9. A duplicate image evidence management system for verifying authentication and integrity, the duplicate image evidence management system comprising:
  an image storage device configured to generate an original image and an original hash value for the original image;
  at least one processor configured to implement an agent configured to check whether the original hash value of the image storage device is changed and allow the original image to be copied when the original hash value is not changed;
  an image collecting device configured to generate a first duplicate image obtained by copying the original image from the image storage device when it is checked by the agent that the original hash value is not changed, generate a first hash value for the first duplicate image, and generate the first duplicate image comprising the first hash value;
  a server configured to:
    receive the first duplicate image comprising the first hash value from the image collecting device to database the first duplicate image;
    obtain a second duplicate image converted from the first duplicate image; and
    when a second hash value for the second duplicate image is generated, database the second duplicate image comprising the second hash value.

10. The duplicate image evidence management system of claim 9, wherein the agent is further configured to generate log information regarding the counterfeiting of the original hash value when the original hash value is changed.

11. The duplicate image evidence management system of claim 9, wherein the at least one processor is further configured to implement a time correction unit configured to generate a time correction value used to correct a difference between standard time and time when the image storage device generates the original image.

12. The duplicate image evidence management system of claim 9, wherein, when the image storage device generates the original image in a volume unit, the agent is further configured to change the original image to be in a file unit and generate an original hash value for the original image in the file unit.

13. The duplicate image evidence management system of claim 9, wherein the second hash value indicates that the second duplicate image is converted from the first duplicate image.

14. The duplicate image evidence management system of claim 9, further comprising a client device configured to:
  receive a database of the first duplicate image from the server and generate a second duplicate image converted from the first duplicate image;
  generate a second hash value indicating that the second duplicate image is converted from the first duplicate image; and
  transmit the second duplicate image comprising the second hash value to the server.

15. A duplicate image evidence management system for verifying authentication and integrity, the duplicate image evidence management system comprising:
  a non-transitory storage medium configured to store an original image;

at least one processor configured to implement:

a hash generating device configured to receive the original image from the non-transitory storage medium and generate an original hash value for the original image; and an agent configured to check whether the original hash value is changed;

an image collecting device configured to generate a first duplicate image, which is obtained by copying the original image from the hash generating device, when the original hash value is not changed, generate a first hash value, and generate the first duplicate image comprising the first hash value; and a server configured to receive the first duplicate image comprising the first hash value from the image collecting device and store database the first duplicate image and, when a second duplicate image converted from the first duplicate image is generated, configured to generate a second hash value indicating that the second duplicate image is converted from the first duplicate image.

16. The duplicate image evidence management system of claim 15, wherein the server is further configured to assign a first code to the first duplicate image comprising the first hash value, assign a second code, which is subordinate to the first code, to the second duplicate image comprising the second hash value, and group the first and second codes and create a history database.

17. The duplicate image evidence management system of claim 15, further comprising a client configured to:

receive the first duplicate image comprising the first hash value from the server;

generate the second duplicate image converted from the first duplicate image;

generate the second hash value indicating that the second duplicate image is converted from the first duplicate image; and transmit the second duplicate image comprising the second hash value to the server.

18. A duplicate image evidence management system for verifying authentication and integrity, the duplicate image evidence management system comprising:

an image storage device configured to generate an original image and an original hash value for the original image; and a server configured to:

generate a first duplicate image obtained by copying the original image when it is checked whether the original hash value is changed and it is determined that the original hash value is not changed;

generate a first hash value for the first duplicate image and generate the first duplicate image comprising the first hash value;

database the first duplicate image comprising the first hash value;

when a second duplicate image converted from the first duplicate image is generated, generate a second hash value indicating that the second duplicate image is converted from the first duplicate image; and generate the second duplicate image comprising the second hash value.

19. The duplicate image evidence management system of claim 18, wherein the server is further configured to:

assign a first code to the first duplicate image comprising the first hash value;

assign a second code to the second duplicate image comprising the second hash value, the second code being subordinate to the first code; and group the first code and the second code to create a history database.

20. The duplicate image evidence management system of claim 18, further comprising a client configured to:

receive the first duplicate image comprising the first hash value from the server;

generate the second duplicate image converted from the first duplicate image; generate the second hash value indicating that the second duplicate image is converted from the first duplicate image; and transmit the second duplicate image comprising the second hash value to the server.

* * * * *